United States Patent
Werpy et al.

(10) Patent No.: US 7,776,782 B2
(45) Date of Patent: Aug. 17, 2010

(54) METHODS OF MAKING TEXTURED CATALYSTS

(75) Inventors: Todd Werpy, West Richland, WA (US); John G. Frye, Jr., Richland, WA (US); Yong Wang, Richland, WA (US); Alan H. Zacher, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 102 days.

(21) Appl. No.: 11/651,360

(22) Filed: Jan. 8, 2007

(65) Prior Publication Data

US 2007/0135303 A1 Jun. 14, 2007

Related U.S. Application Data

(62) Division of application No. 10/672,333, filed on Sep. 25, 2003, now Pat. No. 7,186,668, which is a division of application No. 09/884,606, filed on Jun. 18, 2001, now Pat. No. 6,670,300.

(51) Int. Cl.
| | |
|---|---|
| *B01J 23/00* | (2006.01) |
| *B01J 23/02* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 23/60* | (2006.01) |
| *B01J 23/70* | (2006.01) |
| *B01J 23/72* | (2006.01) |
| *B01J 23/74* | (2006.01) |
| *B01J 21/04* | (2006.01) |

(52) U.S. Cl. ............ 502/185; 502/182; 502/184; 502/313; 502/314; 502/315; 502/316; 502/326; 502/327; 502/328; 502/329; 502/330; 502/331; 502/332; 502/333; 502/334; 502/335; 502/336; 502/337; 502/338; 502/339; 502/349; 502/350; 502/439

(58) Field of Classification Search ............ 502/182, 502/184, 185, 313, 314, 315, 316, 326, 327, 502/328, 329, 330, 331, 332, 333, 334, 335, 502/336, 337, 338, 339, 349, 350, 439
See application file for complete search history.

(56) References Cited

U.S. PATENT DOCUMENTS

| | | | |
|---|---|---|---|
| 3,448,118 A | 6/1969 | Chichery et al. | |
| 3,518,206 A * | 6/1970 | Stiles et al. | 502/64 |
| 3,629,145 A * | 12/1971 | Morikawa et al. | 502/74 |

(Continued)

FOREIGN PATENT DOCUMENTS

CA 2191360 5/1997

(Continued)

*Primary Examiner*—Cam N Nguyen
(74) *Attorney, Agent, or Firm*—Wells St. John P.S.

(57) ABSTRACT

A textured catalyst having a hydrothermally-stable support, a metal oxide and a catalyst component is described. Methods of conducting aqueous phase reactions that are catalyzed by a textured catalyst are also described. The invention also provides methods of making textured catalysts and methods of making chemical products using a textured catalyst.

9 Claims, 8 Drawing Sheets
(3 of 8 Drawing Sheet(s) Filed in Color)

U.S. PATENT DOCUMENTS

| | | | |
|---|---|---|---|
| 3,658,724 A * | 4/1972 | Stiles | 502/183 |
| 3,681,387 A | 8/1972 | Hollstein et al. | |
| 3,736,265 A * | 5/1973 | Suggitt | 502/185 |
| 3,804,779 A * | 4/1974 | Kent et al. | 502/185 |
| 3,978,000 A | 8/1976 | Schmitt et al. | |
| 3,997,473 A | 12/1976 | Schmitt et al. | |
| 4,031,137 A | 6/1977 | Schmitt et al. | |
| 4,082,699 A * | 4/1978 | Petrow et al. | 502/325 |
| 4,186,110 A | 1/1980 | Jalan et al. | |
| 4,280,926 A * | 7/1981 | Abe et al. | 502/159 |
| 4,415,479 A | 11/1983 | Puskas et al. | |
| 4,416,800 A * | 11/1983 | Abe et al. | 502/159 |
| 4,476,242 A | 10/1984 | Puskas et al. | |
| 4,591,578 A | 5/1986 | Foley et al. | |
| 4,609,636 A | 9/1986 | Mabry et al. | |
| 4,659,686 A | 4/1987 | Griffiths et al. | |
| 4,814,464 A | 3/1989 | Olsen | |
| 4,841,069 A | 6/1989 | Olsen | |
| 4,985,572 A | 1/1991 | Kitson et al. | |
| 5,037,791 A | 8/1991 | Comolli et al. | |
| 5,116,800 A | 5/1992 | Williamson et al. | |
| 5,149,680 A | 9/1992 | Kitson et al. | |
| 5,183,713 A | 2/1993 | Kunz | |
| 5,478,952 A | 12/1995 | Schwartz | |
| 5,488,023 A | 1/1996 | Gadkaree et al. | |
| 5,529,968 A | 6/1996 | Sudhakar et al. | |
| 5,559,065 A | 9/1996 | Lauth et al. | |
| 5,576,261 A | 11/1996 | Sudhaker et al. | |
| 5,698,749 A | 12/1997 | Pederson et al. | |
| 5,837,640 A | 11/1998 | Sudhakar et al. | |
| 5,876,867 A | 3/1999 | Itoh et al. | |
| 5,882,619 A | 3/1999 | Heineke et al. | |
| 5,900,386 A * | 5/1999 | Freund et al. | 502/330 |
| 5,972,525 A | 10/1999 | Mori et al. | |
| 5,998,328 A | 12/1999 | Dawes et al. | |
| 6,008,384 A | 12/1999 | Bockrath et al. | |
| 6,040,265 A | 3/2000 | Nunan | |
| 6,040,266 A | 3/2000 | Fay, III et al. | |
| 6,066,410 A | 5/2000 | Auer et al. | |
| 6,162,351 A | 12/2000 | Sudhakar et al. | |
| 6,291,725 B1 | 9/2001 | Chopade et al. | |
| 6,379,834 B1 * | 4/2002 | Giallombardo et al. | 429/44 |
| 6,403,844 B1 | 6/2002 | Zhang et al. | |
| 6,432,866 B1 * | 8/2002 | Tennent et al. | 502/180 |
| 6,465,390 B1 | 10/2002 | Hakata et al. | |
| 6,479,713 B1 | 11/2002 | Werpy et al. | |
| 6,495,730 B1 | 12/2002 | Konishi et al. | |
| 6,509,293 B1 | 1/2003 | Zoeller et al. | |
| 6,962,892 B2 | 11/2005 | Resasco et al. | |
| 2002/0177524 A1 * | 11/2002 | Hiraoka et al. | 502/185 |
| 2004/0171480 A1 | 9/2004 | Hampden-Smith et al. | |

FOREIGN PATENT DOCUMENTS

| | | |
|---|---|---|
| CN | 1314208 | 9/2001 |
| JP | 57105245 | 6/1982 |
| JP | 5261284 | 10/1992 |
| JP | 5220489 | 8/1993 |
| JP | 6116182 | 4/1994 |
| JP | 6-157490 | 6/1994 |
| JP | 6-157491 | 6/1994 |
| JP | 6-179667 | 6/1994 |
| JP | 10099685 | 4/1998 |
| JP | 11239796 | 9/1999 |
| JP | 11253799 | 9/1999 |
| WO | WO 99/15272 | 4/1999 |
| WO | WO 02/40143 A2 | 5/2002 |

* cited by examiner

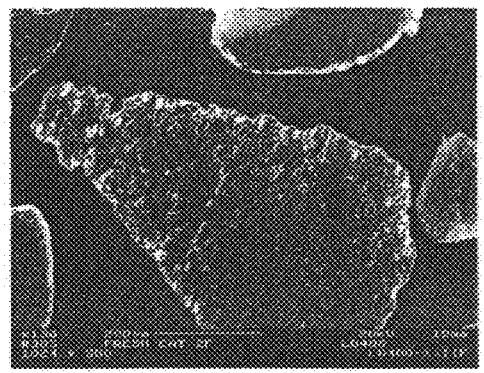
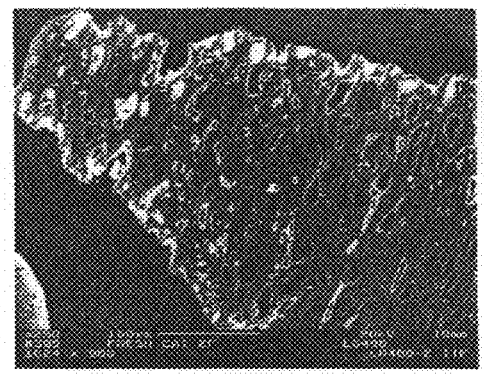
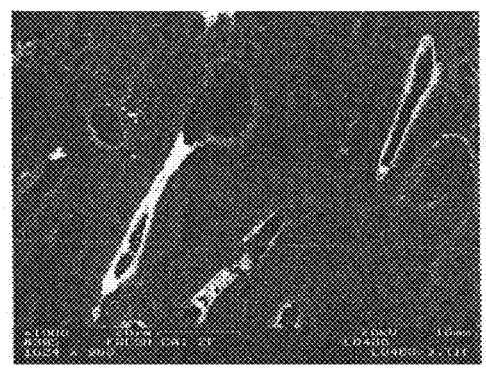
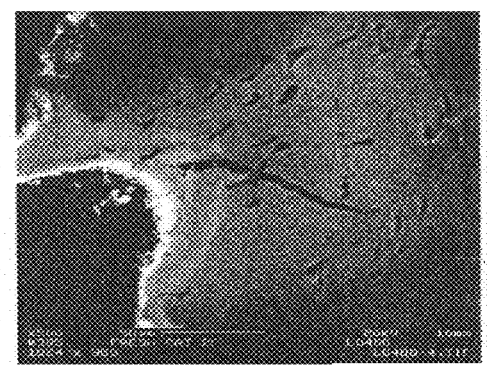
Fig. 1

US 7,776,782 B2

METHODS OF MAKING TEXTURED CATALYSTS

RELATED PATENT DATA

This patent application is a divisional application of Ser. No. 10/672,333, filed Sep. 25, 2003 now U.S. Pat. No. 7,186,668 which is a divisional application of Ser. No. 09/884,606, filed Jun. 18, 2001, now U.S. Pat. No. 6,670,300.

STATEMENT OF GOVERNMENT RIGHTS

This invention was made with Government support under contract DE-AC0676RLO 1830 awarded by the U.S. Department of Energy. The Government has certain rights in this invention.

FIELD OF THE INVENTION

The present invention relates to textured catalysts and methods of making textured catalysts. The invention also relates to the use of textured catalysts as catalysts for reactions conducted in hydrothermal conditions.

BACKGROUND OF THE INVENTION

For many years there has been active and increasing interest in conducting chemical processing in aqueous media. In many cases, a potential feedstock is produced along with water. This occurs, for example, in the commercial maleic anhydride process. Alternatively, in the case of fermentations, potential feedstocks are themselves produced in water. Removal of water from these compositions would be time-consuming and costly. Additionally, water has many advantages over more conventional solvents that present problems with toxicity and difficulties with handling and disposal.

On the other hand, water is a relatively reactive medium and most conventional catalysts would quickly become deactivated. To overcome this problem, several workers have conducted aqueous phase reactions over carbon-supported catalysts. For example, Olsen in U.S. Pat. No. 4,812,464 described certain aqueous phase hydrogenations over a palladium on carbon catalyst. Schwartz in U.S. Pat. No. 5,478,952 described the use of catalysts composed of highly dispersed ruthenium and rhenium on a carbon support for catalyzing aqueous phase hydrogenations.

Unlike many oxide supports, carbon supports can maintain their integrity under aqueous, acidic or basic reaction conditions. Carbon supports are also available with exceptionally high surface areas allowing preparation of catalysts with a high dispersion of active metals. Unfortunately, much of the surface area is contained within small micropores, which can result in severe mass transport limitations. As a consequence, many carbon supports are prepared as very fine powders to minimize mass transport effects due to pore diffusion limitations.

It has been found that many catalytic metals, once reduced, are not tightly bound to a carbon surface. During operation, these loosely bound catalytic metals can sinter, or agglomerate, thereby greatly reducing the available catalytic surface area. To lessen the effects of sintering, manufacturers typically limit the amount of catalytically-active metal to less than 1 weight percent of the total catalyst. While this results in a more efficient use of catalytic metal, it requires a larger bed to achieve the required conversions.

To improve properties of carbon-based catalysts, Heineke et al., in Canadian Patent No. 2,191,360, described certain carbon-based catalysts having a titania coating. In the invention of Heineke et al., a carbon support is treated with a Ti or Zr alkoxide, halide or mixed alkoxide-halide. Suitable carbon supports are generally suspended graphite or activated charcoal. Treatment of the carbon support with the Ti or Zr compound is preferably carried out in anhydrous solvents. The reaction is terminated by quenching with a small amount of water. The catalysts are then prepared by precipitating platinum in an aqueous medium using a reducing agent. In the examples, Heineke et al. suspended graphite particles in dry n-butanol and added titanium tetraisopropoxide or titanium tetrachloride followed by stirring for 2 days. Then water was added and the resulting particles are filtered off and dried. The resulting material was treated with an aqueous solution of hexachloroplatinic acid at a pH of 2.75. The platinum was precipitated by addition of sodium formate. The catalysts were tested in the hydrogenation of NO to $NH_2OH$. Compared with catalysts lacking the titania layer, Heineke's catalysts showed better $NH_2OH$ selectivity (86.77 and 91.96 vs. 86.36 and 89.90) and space-time yield (0.798 and 0.897 vs. 0.788 and 0.870).

Despite these, and many other efforts, there remains a need for catalysts having new properties, especially catalysts that are stable in aqueous phase conditions. There also remains a need for new and cost-effective methods of making catalysts. There further remains a need for new aqueous phase catalytic reactions.

SUMMARY OF THE INVENTION

In a first aspect, the invention provides a textured catalyst comprising a hydrothermally-stable, porous support comprising a porous interior and an exterior surface; a metal oxide; and a catalyst component. The porous support has a minimum, smallest dimension of at least about 100 μm. Viewed in cross-section, at least about 70% of the catalyst component is within about 5 μm of the minimum cross-sectional area that encompasses about 80% of the metal oxide. Also, at least about 5% of the catalyst component is at least about 10 μm from the exterior of the support.

In a second aspect, the invention provides a method of making a catalyst. This method includes: providing a porous, hydrothermally-stable support; forming a sol comprising metal oxide particles; adding a catalyst component; and drying. The porous, hydrothermally-stable support is directly contacted with a sol comprising metal oxide particles.

The invention also provides a method of conducting a catalyzed reaction under hydrothermal conditions. In this method, at least one reactant passes into a reaction chamber. The reactant is in an aqueous solution. A catalyst is present in the reaction chamber. This catalyst was made by forming a sol of a metal oxide at a pH that is within 2 of the pH of the aqueous solution; adding a catalyst metal; and depositing the metal oxide and the catalyst metal onto a porous, hydrothermally-stable support. The at least one reactant is reacted in the presence of the catalyst and under hydrothermal conditions. At least one product is obtained from the reaction chamber. The product obtained has a higher purity or a higher yield than the product obtained in a comparative test under similar conditions except where the reaction is conducted at a pH that is 4 or greater than the pH of the aqueous solution.

The invention further provides a method of conducting a catalyzed reaction under hydrothermal conditions, comprising: passing at least one reactant into a reaction chamber; reacting the at least one reactant in the presence of the catalyst and under hydrothermal conditions; and obtaining at least one product from the reaction chamber. In this method, the reactant is in an aqueous solution. A catalyst is present in the reaction chamber. The catalyst includes: a porous, hydrothermally-stable support; a metal oxide disposed on the support; and a catalyst component.

Catalysts of the invention (which may be termed "textured" catalysts because the metal oxide imparts additional "texture" to the porous substrate) can be active and stable, even in aqueous conditions. The textured catalysts can also offer other advantages, such as selectivity. Compared to conventional catalysts and reactions using conventional catalysts, the inventive catalysts and reactions can exhibit unexpectedly superior properties. For example, the inventive catalysts having a metal oxide coating on activated carbon can provide (a) better dispersion of the active metal on the catalyst surface, (b) better stability of the active metal on the catalyst (as opposed to putting the active metal directly on the carbon), and (c) enhanced activity and selectivity. The texturing agent may also be responsible for distributing active components primarily in larger pores such that reactions of substrate are substantially excluded from micropores, reducing diffusion limitations. If a substrate were to react in deeper pores, products that are easily susceptible to over-reactions may be less able to quickly diffuse out of the catalyst and be subject to continued interaction with active metal sites producing unwanted byproducts. The texturing agent may also have the effect of ensuring that the higher value catalytic metals are preferentially partitioned to the easily accessible surface area over the deeper, less accessible pores, thereby requiring less metal to achieve equivalent catalytic activity over standard catalysts.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a series of black and white photomicrographs of a cross-section of a textured catalyst obtained by scanning electron microscopy (SEM) at a series of magnification levels.

FIG. 3 is a series of SEM photomicrograph views obtained by element mapping that show the distribution of Si (yellow), Zr (green) and Pd (red) in a cross-section of a freshly-prepared textured catalyst. The section of catalyst analyzed is the same as in the middle-left of FIG. 1.

GLOSSARY OF TERMS

Figure 2:
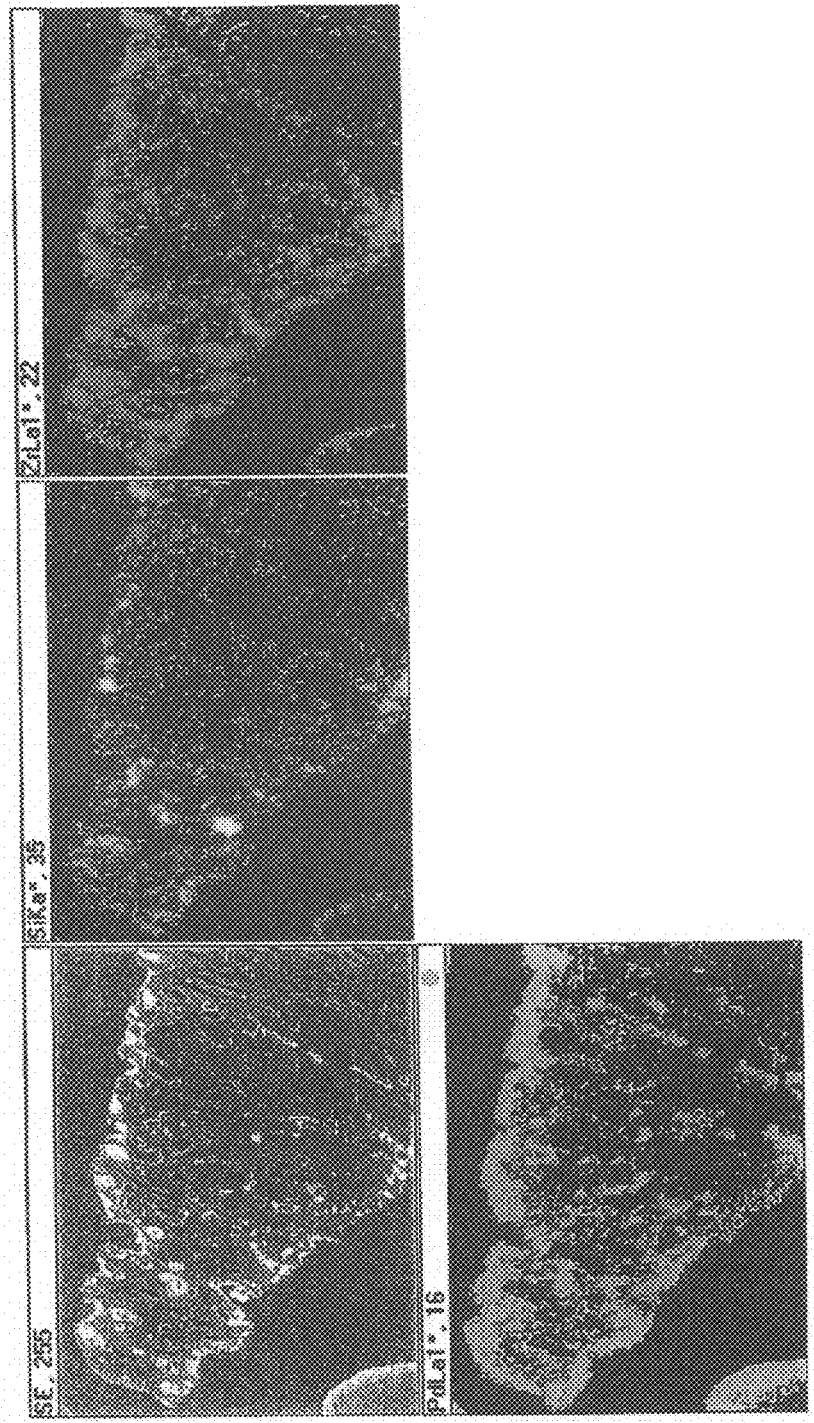
FIG. 2 is a series of SEM photomicrograph views obtained by element mapping that show the distribution of Si (yellow), Zr (green) and Pd (red) in a cross-section of a freshly-prepared textured catalyst. The section of catalyst analyzed is the same as in the top-right of FIG. 1.
Figure 7:
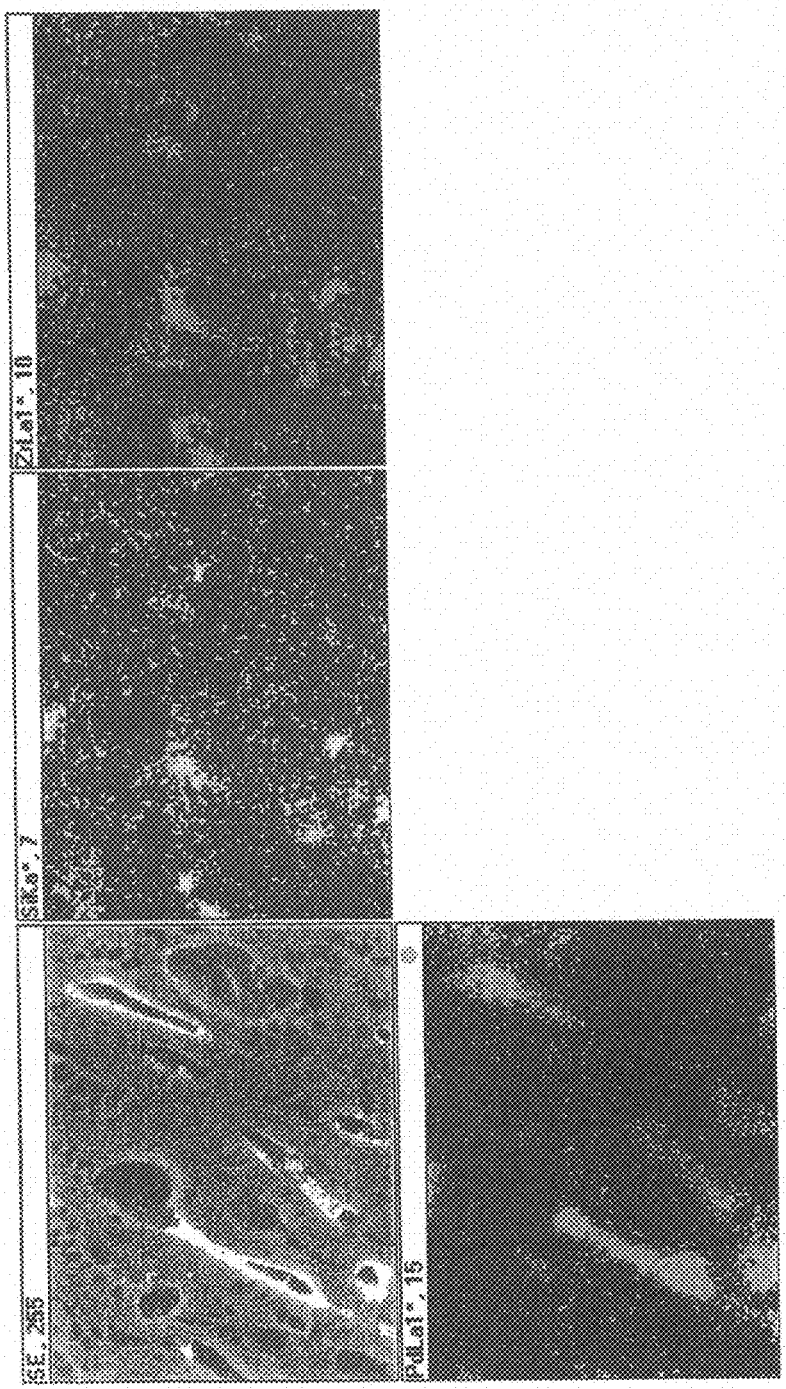
Figure 4:
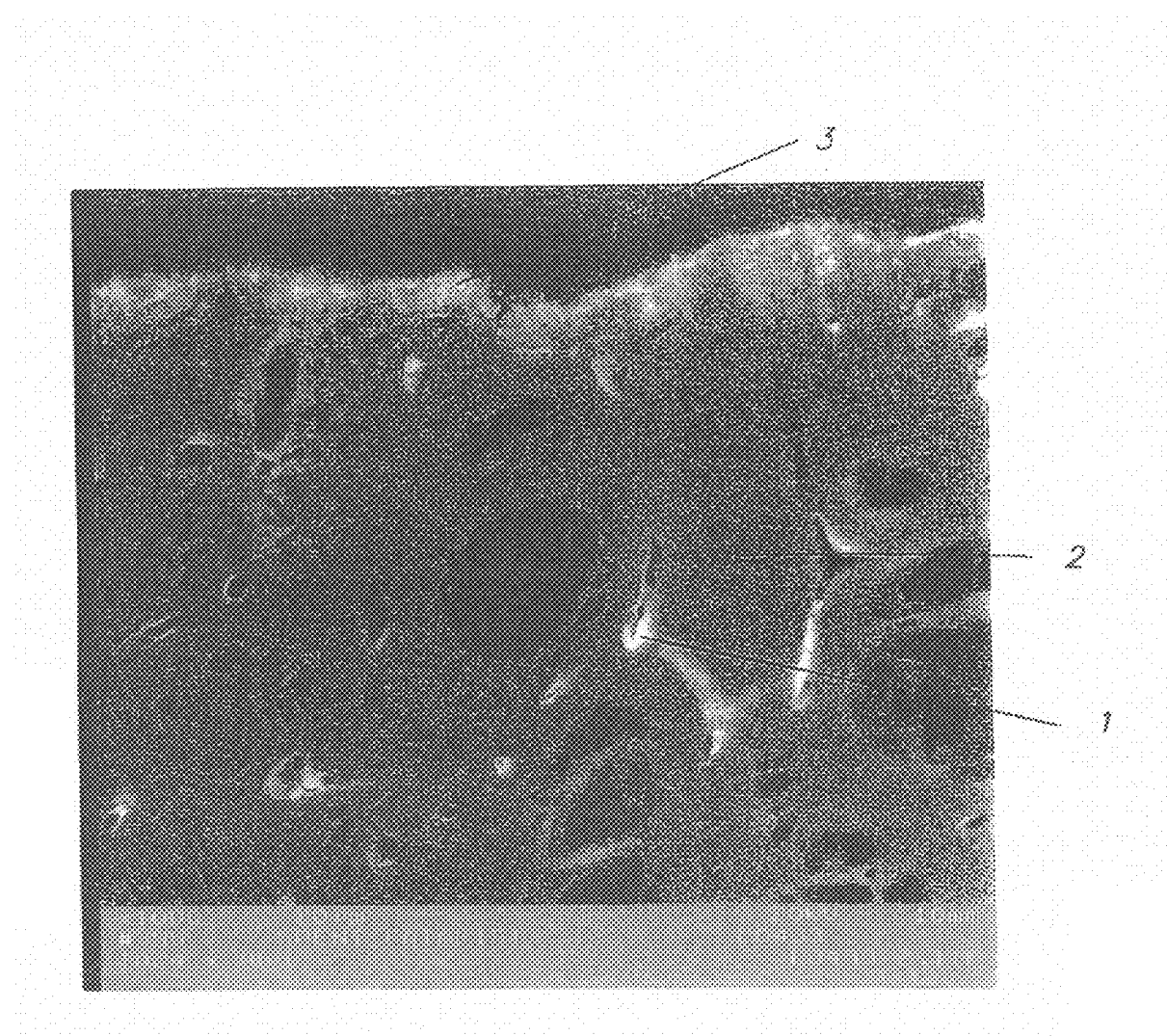
FIG. 4 is a black and white photomicrograph (×1000 magnification; 2.3 cm=20 μm) of a cross-section of a textured catalyst after use and recovery from a reaction apparatus. The numerical numbers indicate the spots where energy dispersive X-ray emission analysis (EDX) were performed.
Figure 5A:
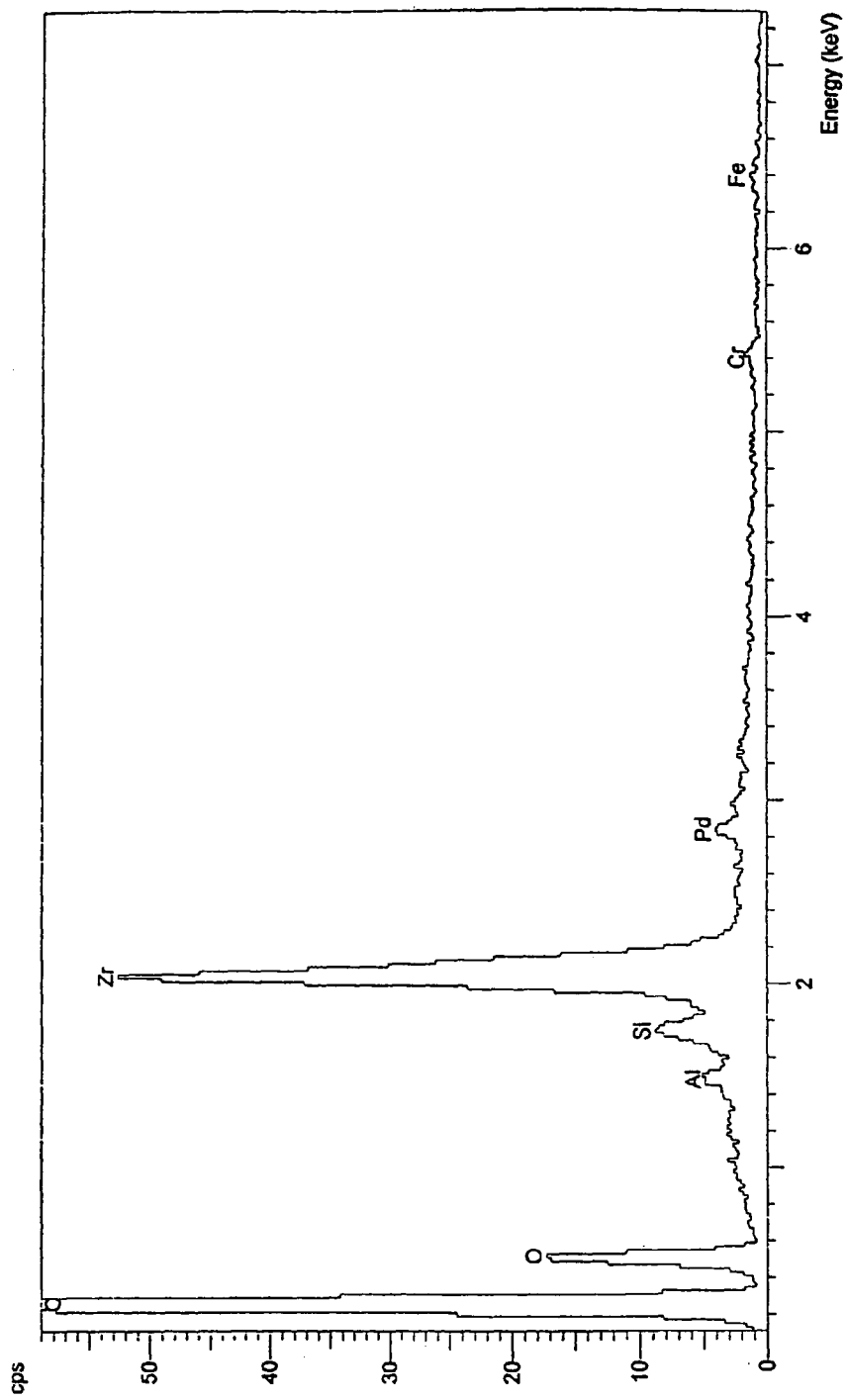
FIGS. 5a-5c show plots with intensities due to emissions of C, Pd and Zr nuclei at the locations identified in FIG. 4 as 1 (FIG. 5a), 2 (FIG. 5b) and 3 (FIG. 5c).
Figure 5B:
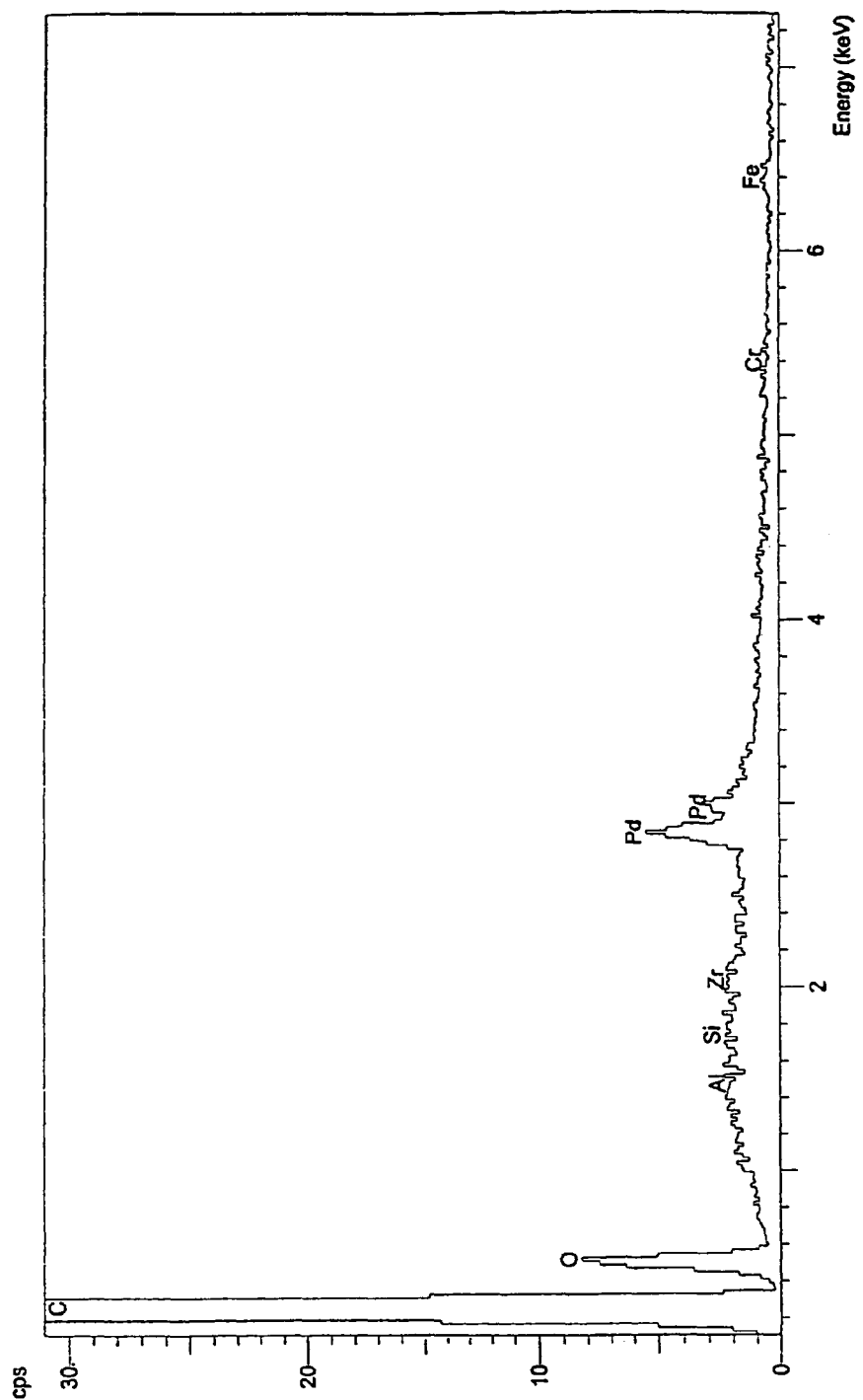
Figure 5C:
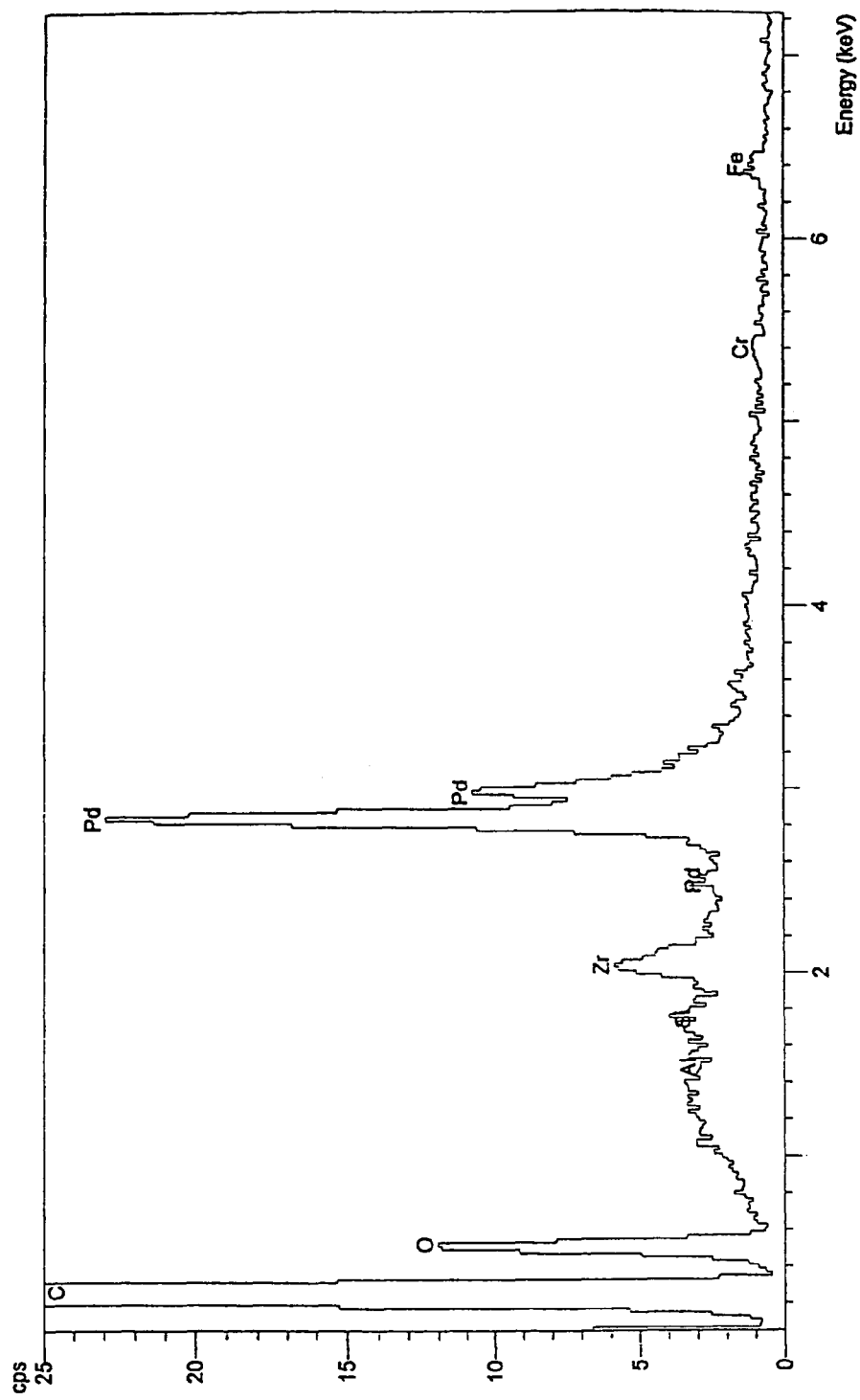
Figure 6:
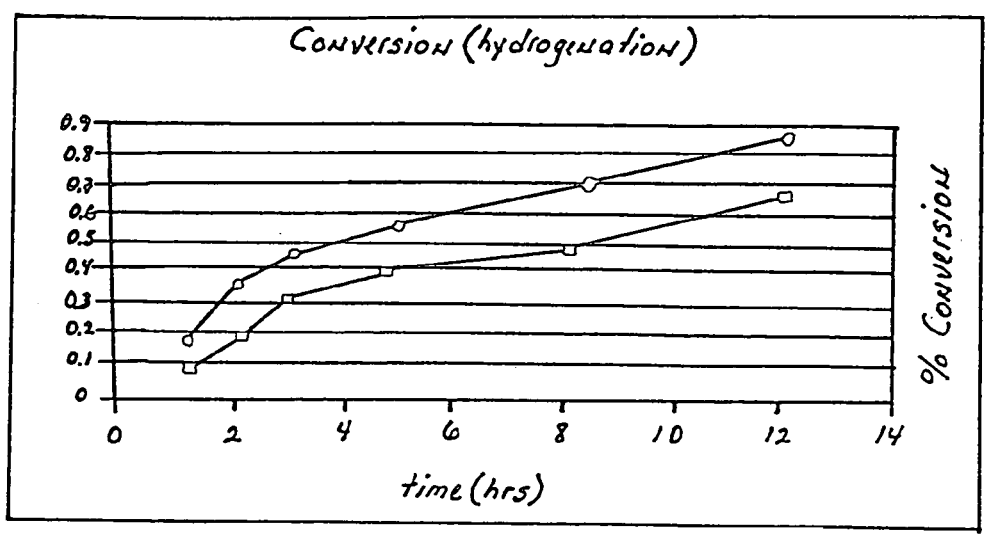
FIG. 6 is a graph comparing the % conversion of succinic acid that was hydrogenated in an aqueous solution under identical conditions except using a 2.5 wt. % Pd/5.0 wt. % $ZrO_2$/carbon catalyst (upper curve) or a 2.5 wt. % Pd/carbon catalyst (lower curve).

A "porous" material is one that has at least 10% porosity by volume. Porosity and pore size are typically measured by mercury porisimetry and nitrogen adsorption (BET).

"Hydrothermal conditions" are the presence of a water phase (more than a small amount of dissolved water) at greater than 100° C. and pressures of greater than 1 atm and may include supercritical conditions. A "hydrothermally-stable" material loses less than 15% of its surface area after 24 hours in water at 150° C. at the vapor pressure of water under these conditions (with an initial loading of the material in water of 10 g material 100 g water); more preferably, a "hydrothermally-stable" material loses less than 5% of its surface area after 72 hours in water at 250° C. at the vapor pressure of water under these conditions.

A metal oxide "sol" is a suspension of oligomers and/or colloidal particles, where monomers make up less than 50% of the metal mass of the composition.

The "smallest dimension" of a particle refers to the average minimum dimension, i.e. the average particle diameter in any direction. For two dimensions, this can be measured from a cross-section viewed by SEM. For example, in the wedge-shaped cross-section of the particle in FIG. 1, particle diameter would be measured at several points from the base to the apex and averaged. Alternatively, the "smallest dimension" can be partly measured by sieving, in which case the two largest dimensions are as least as large as mesh size, that is, the theoretical or actual smallest sized mesh through which the particle could pass. The third dimension can be measured by SEM or optical microscopic. inspection of the whole (uncut) particles to insure that there is not a platelet or flake morphology whose average minimum dimension would fall below a threshold value.

DESCRIPTION OF PREFERRED EMBODIMENTS

Supports selected in the present invention are preferably selected to be stable in the reactor environment in which they are intended for use. Preferably, the supports are hydrothermally-stable, meaning that the support loses less than 15% of its surface area after 72 hours in water at 150° C. More preferably, the support is hydrothermally-stable such that it loses less than 5% of its surface area after 72 hours in water at 150° C. Preferred support materials include porous carbon and rutile. An especially preferred support is a porous, high surface area activated carbon, such as carbons with CTC values around 120%, available from Calgon and Engelhard.

For good dispersion of the catalytic sites, the support preferably has a high surface area, preferably at least 100 m$^2$ per gram (cm$^2$/g), and in some preferred embodiments between 100 and 2000 m$^2$/g, as measured by BET nitrogen adsorption. Porous supports have high surface area.

A "porous" material has a pore volume of 10 to 98%, more preferably 30 to 90% of the total porous material's volume. Preferably, at least 20% (more preferably at least 50%) of the material's pore volume is composed of pores in the size (diameter) range of greater than 20 angstroms, more preferably 20 to 1000 angstroms. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm).

A metal oxide is disposed on the porous support. Preferably, for aqueous phase applications, the oxide contains at least one of Zr, Ti, Hf, Ta, Nb, Mo, and W. Preferably, the metal oxide contains at least 50%, more preferably at least 90%, by mass of an oxide or oxides of one or more of Zr, Ti, Hf, Ta, Nb, Mo, and W. In some embodiments, the metal oxide is substantially completely composed of an oxide or oxides of one or more of Zr, Ti, Hf, Mo, and W. The rutile form of titania is especially preferred. In alternative embodiments, oxides of other elements such as Si, Al, Zn, Sn, V, Fe, U, Th, etc. may be used. The metal oxide is preferably present in 1 to 25 weight %, more preferably 5 to 10 weight percent of the total weight of the dried catalyst. Typically, the metal of the metal oxide is fully oxidized (for example $TiO_2$, $ZrO_2$, etc.) with terminal or bridging oxides; however, in less preferred embodiments the oxide could contain, in addition to oxygen, hydrogen in hydroxyls (which may be difficult to differentiate from hydrated oxides), sufides, cations, oxygen-containing anions, and the like.

The catalyst component includes a catalytically active metal, and the catalyst component has a different composition than the metal oxide. The catalyst component may be any catalyst metal or catalyst compound. For many embodiments, the catalyst component contains at least one element selected from Pd, Ru, Rh, Pt, Re, Ni, Cu, Au, Ag, Co, Fe, Os, and Ir. In some preferred embodiments, the catalyst component is a fully reduced metal or mixture of fully reduced metals. The catalyst component is preferably present in 0.1 to 10 weight %, more preferably 2.5 to 5.0 weight percent of the total weight of the dried catalyst.

Various embodiments of the inventive catalyst provide unique structural characteristics. Without intending to limit the scope of the invention, it is believed that, during catalyst preparation, kinetic and steric effects limit distribution of the agglomerates, so that the metal oxide and the catalyst component are distributed mainly on the exterior of the support and through the larger pores and channels in the support. Under reaction conditions, the catalyst component remains associated with the metal oxide—thus stabilizing the catalyst. Some of the catalyst component may continue to migrate through the large pores and further into the interior of the catalyst; although the explanation for this is unclear, it can be a beneficial effect since it serves to further distribute catalyst component within the larger pores thus forming more surface active sites for catalysis.

FIG. 1 shows scanning electron microscope (SEM) photomicrographs of a cross-section of freshly prepared catalyst. This catalyst was made by an incipient wetness catalyst preparation technique. This was done by taking a 20.03 g sample of an Engelhard carbon (CTC=121%, 20-50 mesh, liquid holding capacity by the incipient wetness technique of 1.0 cc/g) to prepare a 2.5% palladium and 5% zirconia catalyst. The impregnation volume of this preparation was about 20 ml. The amounts of palladium and zirconia are specified as final weight percent of the reduced metal on the carbon support. Thus, the required weight of active metal precursor was back calculated to determine the necessary weight of palladium nitrate and zirconyl nitrate. For this example, 0.54 g of palladium metal is required, and thus 3.71 of palladium nitrate stock solution was required (at 14.57% palladium metal by weight). Also, 1.08 g of zirconium metal was required, and thus 2.74 g of zirconyl nitrate are required. In a beaker, 8.32 g of water was added along with 0.84 g of 70% nitric acid. 2.74 g of zirconyl nitrate was added and the beaker was heated and stirred on a hot plate without boiling until the solids dissolve (~80° C. for about 45 minutes). About 1.4 g of water was evaporated during this process. This solution was then transferred to a graduated cylinder while still hot and 3.79 g of palladium nitrate was added to the cylinder. The solution was then heated and topped up to a final volume of 20 ml. The solution remained under low heat for about 30 minutes. The solution was then added in 1 to 2 ml aliquots to the jar containing the 20 g of carbon. After each addition, the jar was capped and shaken until the carbon flowed freely in the vessel. Upon addition of the entire volume of solution, the carbon was sticky and slightly clumped. The carbon sat closed at room temperature with intermittent agitation for 1.5 hours and appeared dry and mostly granular, with some material still adhering to the walls of the jar. The support was then placed uncapped in a vacuum oven set to 85° C. and 20 inHg vacuum and left to dry overnight. The catalyst was reduced prior to use.

Samples for SEM analysis were prepared by cutting a resin embedded catalyst particle with an ultramicrotome. FIGS. 2 and 3 show the same catalyst using an element mapping, x-ray spectroscopic technique. These figures show the distribution of Si (in yellow, a contaminant), Zr (green), and Pd (red).

In this catalyst it can be seen that the Zr and the Pd are both distributed on the particle's exterior and in the larger pores with little or no distribution in the smaller pores, especially the small pores furthest from the particle's surface. A limitation of this analytical technique is that the pore size is observed only in a single plane. Passages to and from the observed pores will vary in size. Thus, while some relatively large pores appear devoid of Pd or Zr, this effect may be caused by blockages in narrow passages that lead into these large pores, as they may be accessible only through micropores. The Pd and Zr concentrate in the same areas of the catalyst. Surface area and stability of the Pd is increased by association with the zirconia. Another desirable effect that can be observed is the preferential distribution of metal oxide and catalyst metal on the particle exterior and in the large pores; that is, preferred distribution in the most accessible areas of the catalyst resulting in desirable kinetics and product distribution. FIG. 3 shows that some internal pores may contain surprisingly high quantities of the catalyst metal. It may be that the macropores shown are cross-sectional elements of macropores that traverse from the exterior of the carbon deep into the interior where the slice was taken. It is expected that these types of macropores are ideal candidates for active catalytic surface, as they are areas of low diffusion limitations that would not be properly exploited in a typical industrial standard edge coat.

FIGS. 4 and 5a-5c show the distribution of elements in a textured catalyst after about 4 hours of catalyzing the hydrogenation of succinic acid under hydrothermal conditions. Location 1, an internal pore, shows a high concentration of Zr with very little Pd. Location 2 is a dense section of the activated carbon, and, as expected, shows essentially pure carbon. Analysis of location 3, the surface, indicates a relatively high ratio of Pd to Zr.

In some preferred embodiments, the catalyst is characterized by one or more of the following characteristics: a minimum, smallest dimension of at least about 100 Pm, more preferably at least about 300 µm; at least 70%, more preferably at least 80% of the catalyst component is within about 5 µm, more preferably about 2 µm, of 80% of the minimum area of the metal oxide. Preferably, at least about 5%, more preferably at least about 10%, of the catalyst component, and at least about 5%, more preferably at least about 10%, of the metal oxide is disposed in pores that are at least about 10 μm, more preferably at least about 20 μm, away from the exterior of the support. The foregoing properties are conducted by cutting a catalyst particle or monolith to obtain a cross-section of at least about 100 μm in both height and width. The metal oxide is then imaged by an elemental analysis spectroscopic technique, and the minimum area that encompasses 80% of the metal oxide is then identified. This area (or areas) is then increased by a 5 (or 2) μm margin around each area or areas. Then, the distribution of catalyst in the cross-sectional area is imaged by an elemental analysis spectroscopic technique; at least 70% of the catalyst component is within the area of the 80% of metal oxide (including the margin). Amounts of each element is quantified by intensity. It is not necessary that all cross-sections exhibit the characteristics described herein, but, for a desired catalyst, at least some cross-section has these characteristics. Preferably, the 80% of the metal oxide plus 5 μm margin occupies less than 90%, more preferably less than 40%, of the total cross-sectional area. The converse preferably also occurs, that is, at least 70%, more preferably at least 80%, of the metal oxide is within the minimum area of 80% of the catalyst component plus a 5 (or 2) μm margin around each area or areas.

Preferably, at least about 50% of the catalyst component is within about 10 μm of the exterior of the support. In some embodiments, some internal pores have at least 2 times, and in some cases at least 3 times, as much of the catalyst component as compared with the metal oxide. In preferred embodiments, the majority, more preferably at least about 80%, of catalyst component, and/or the metal oxide, that is located within the interior of the support (that is, that portion of the catalyst component and/or metal oxide which is at least about 10 μm from the exterior of the support) is located in pores having at least one dimension of at least about 5 μm. The foregoing values are measured based on SEM analysis of cross-sections of catalysts.

Some preferred embodiments of the inventive catalysts may, alternatively, be described with reference to the method by which the catalyst is made. Alternatively, some preferred embodiments of the invention can be described by reactivities. For example, in some preferred embodiments, the catalyst exhibits a succinic acid conversion of at least 50% after 5 hours under the conditions set forth in Table 1.

Catalysts are preferably made by solution/colloid techniques. A porous support may be purchased or prepared by known methods. A metal oxide sol is prepared or obtained. A sol may be prepared, for example, by dissolving a metal compound and adding water or changing pH to form a sol. Each of the oligomeric or colloidal particles in the sol contain a metal and oxygen; these particles may also contain other components such as halides, cations, etc. The sol could be prepared, for example, by dissolving a metal alkoxide, halide, etc. in an anhydrous solvent, then adding sufficient water to form a sol. In some preferred embodiments, organic solvents are avoided and the sol is prepared only in water. Conditions for preparing sols will depend on the type of metal and available ligands. In some preferred embodiments, the sol is prepared at between about 10 and about 50° C. In some preferred embodiments, in aqueous solutions, the sol is preferably formed at a pH of between 1 and 6, more preferably between 2 and 5. The metal oxide precursor sol is contacted with the porous support. This could be done, for example, by dipping the support in the sol or colloid, or dispersing the sol in a volume of solvent equivalent to the insipient wetness of the support, so that the solvent exactly fills the void fraction of the catalyst upon contacting and is dried to deposit the metal oxide on the surface of the support. In the case of a particulate support, such as activated carbon powders, the support and metal oxide precursor composition can be mixed in a suspension. The porous support is preferably not coated by a vapor-deposited layer, more preferably the method of making the catalyst does not have any vapor deposition step. The catalyst component can be deposited subsequent to, or simultaneous with, the deposition of the metal oxide. The catalyst component can be impregnated into the support in a single-step, or by multi-step impregnation processes. In a preferred method, the precursor for the catalyst component is prepared in a sol that is deposited after, or codeposited with, the metal oxide precursor sol. In some preferred embodiments, the precursor for the catalyst component is prepared under the same conditions as the metal oxide precursor sol, for example as an aqueous colloidal mixture in the desired pH range. After the metal oxide and catalyst component have been deposited, the catalyst is typically dried. Also, following deposition, if desired, the catalyst component can be activated or stabilized by an appropriate technique such as reduction under a hydrogen-containing atmosphere.

In its broader aspects, the invention includes heterogeneous, catalyzed reactions under any conditions. Preferably, to best take advantage of the unique characteristics of the inventive catalysts, at least one reactant is transported to the catalyst in a liquid phase, more preferably in the aqueous phase (a subset of the liquid phase). The liquid phase includes liquid, near critical, supercritical phases, and a neat phase comprised of a liquid primary reactant or a mixture of a liquid primary reactant and products. Additional reactants can be carried to the catalyst in the gas phase (such as hydrogen, etc.), in nonaqueous solvents, or as solids. Preferred nonaqueous solvents include dioxane and ethers. Preferred reactants include maleic acid, succinic acid, lactic acid, malic acid, and their analogs and derivatives. "Aqueous phase" means that the feedstream containing the at least one reactant contains at least 20 mass %, more preferably at least 50%, and still more preferably at least 80%, water. More preferably, the catalyzed reaction occurs under hydrothermal conditions. In some preferred embodiments the reaction occurs in the absence of organic solvents. In some preferred embodiments, the catalyzed reaction occurs in a temperature range of 120° C. to 260° C., more preferably 180 to 220° C. In some embodiments, the aqueous phase has a pH of between 1 and 6, more preferably 2 to 5. In some embodiments, the reaction occurs at a total pressure of between about 1 atm and 210 atm. The reactions are not limited to the type of reactor configuration, and may, for example, be fixed bed, fluidized bed, batch, stirred tank reactor, membrane reactor, etc.

The catalyst of FIG. 1 was compared against a 2.5% palladium edge-coated catalyst from Engelhard. The two catalysts were tested in a 250 ml Parr Reactor at 225° C. and 2500 psi (17 MPa) with 20% by weight succinic acid and hydrogen as the cover gas. Catalysts were reduced at 120° C. for 4 hours in an atmosphere of 20% hydrogen and 80% nitrogen. The table below shows the individual properties of both tests:

TABLE 1

| Catalyst Type | 2.5% Pd/5% Zr on Engelhard CTC121% Carbon | 2.5% Pd on Carbon (Engelhard edgecoat) |
|---|---|---|
| Date | May 28, 1998 | Jun. 15, 1998 |
| Catalyst Loadout | 2.51 g | 2.53 g |
| Feedstock Composition | 81.67 g water/20.76 g succinic acid | 81.95 g water/20.74 g succinic acid |
| Operating Temperature | 225° C. | 225° C. |
| Operating Pressure | 2500 psi (17 MPa) | 2500 psi (17 MPa) |
| Cover Gas | Hydrogen | Hydrogen |

TABLE 1-continued

| Sampling Intervals | 1, 2, 3, 5, 8, 12, 24 hours | 1, 2, 3, 5, 8, 12 hours |
|---|---|---|

The results for this particular example are shown below:

| | Sample | | | |
|---|---|---|---|---|
| | (2.5% Pd/5% Zr) | | (2.5% Pd edgecoat) | |
| Hour | Conversion (%) | Selectivity to GBL | Conversion | Selectivity to GBL |
| 1 | 17.8 | 1 | 8.6 | 1 |
| 2 | 34.5 | 1 | 18.3 | 1 |
| 3 | 44.7 | 1 | 31.4 | 1 |
| 5 | 56.8 | 1 | 37.8 | 1 |
| 8 | 68.9 | 1 | 50.6 | 1 |
| 12 | 83.2 | 0.993 | 63.3 | 1 |
| 24 | 98.2 | 0.919 | no sample | no sample |

Another comparative test was run comparing 5% Rh/C and 5% Rh/5% Zr/C. Both catalysts were prepared by the incipient wetness method similar to that described above and reduced in a 20% $H_2$ for 4 hours at 120° C. Both catalysts were tested using the same feedstock (20% aqueous diammonium succinate) run under identical conditions (265° C., 1900 psig (13 MPa) under $H_2$ pressure, hourly sampling). The maximum yield of 2-pyrrolidinone was 73% in each case, but the maximum yield occurred more quickly for the textured catalyst. The calculated WWH (g converted/g catalyst/hour) at 90% conversion was 2.05 for the 5% Rh/C catalyst and 3.61 for the 5% Rh/5% Zr/C catalyst.

As shown in the above-described examples, and other testing, it was surprisingly found that the textured catalyst demonstrated unexpectedly superior results when compared to a conventional edge-coated catalyst having the same weight % of catalyst component.

CLOSURE

While preferred embodiments of the present invention have been described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of making a catalyst consisting of:
providing a porous, hydrothermally-stable support having at least 10% porosity by volume, wherein the support comprises carbon having a CTC of at least about 120%;
contacting the support with a sol comprising metal oxide particles and water;
in the presence of the sol, adding a catalyst component comprising at least one metal selected from the group consisting of Pd, Ru, Rh, Pt, Re, Ni, Cu, Au, Ag, Co, Fe, Os and Ir;
drying; and
reducing the catalyst component
wherein the porous, hydrothermally-stable support is directly contacted with the sol comprising metal oxide particles.

2. The method of claim 1 wherein the metal oxide particles comprise an oxide of a metal or metals selected from the group consisting of: Ti, V, Zr, Hf, Ta, Nb, Mo and W.

3. The method of claim 2 wherein the metal oxide particles comprise colloidal sized particles.

4. The method of claim 1 wherein the catalyst component is in an aqueous suspension, and wherein the metal oxide particles and the catalyst component are coprecipitated.

5. The method of claim 1 wherein the catalyst component is reduced prior to the adding.

6. The method of claim 1 wherein the sol comprising metal oxide particles is in an aqueous solution having a pH between 1 and 6.

7. The method of claim 6 wherein the sol comprises a colloidal suspension.

8. The method of claim 1 wherein the sol and the catalyst component are added simultaneously.

9. The method of claim 1 wherein the catalyst component is added after the sol.

* * * * *

UNITED STATES PATENT AND TRADEMARK OFFICE
CERTIFICATE OF CORRECTION

| | | |
|---|---|---|
| PATENT NO. | : 7,776,782 B2 | Page 1 of 1 |
| APPLICATION NO. | : 11/651360 | |
| DATED | : August 17, 2010 | |
| INVENTOR(S) | : Todd Werpy et al. | |

It is certified that error appears in the above-identified patent and that said Letters Patent is hereby corrected as shown below:

Column 4, line 35 – Replace "microscopic. inspection" with --microscopic inspection--

Column 5, line 22 – Replace "sufides" with --sulfides--

Signed and Sealed this
Third Day of May, 2011

David J. Kappos
*Director of the United States Patent and Trademark Office*